(12) United States Patent
Ham (10) Patent No.: US 6,184,961 B1
(45) Date of Patent: *Feb. 6, 2001

(54) IN-PLANE SWITCHING MODE LIQUID CRYSTAL DISPLAY DEVICE HAVING OPPOSITE ALIGNMENT DIRECTIONS FOR TWO ADJACENT DOMAINS

(75) Inventor: Yong-Sung Ham, Kyoungki-do (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/110,961

(22) Filed: Jul. 7, 1998

(30) Foreign Application Priority Data

| Jul. 7, 1997 | (KR) | 97-31257 |
| May 13, 1998 | (KR) | 98-17254 |

(51) Int. Cl.[7] .................... G02F 1/1343; G02F 1/1337
(52) U.S. Cl. ................ 349/141; 349/129; 349/143
(58) Field of Search ................. 349/129, 141, 349/143, 201

(56) References Cited

U.S. PATENT DOCUMENTS

| 4,239,346 | 12/1980 | Lloyd ............................. 350/334 |
| 4,726,659 | 2/1988 | Conrad et al. ................... 350/341 |
| 5,307,189 | 4/1994 | Nishiki et al. ................... 359/59 |
| 5,309,264 | * 5/1994 | Lien et al. ....................... 359/87 |
| 5,321,535 | 6/1994 | Ukai et al. ...................... 359/55 |
| 5,416,619 | * 5/1995 | Koike ............................. 359/57 |
| 5,459,596 | 10/1995 | Ueda et al. ...................... 359/59 |

(List continued on next page.)

FOREIGN PATENT DOCUMENTS

| 0 368 260 | 5/1990 | (EP) . |
| 0 588 568 A2 | 3/1994 | (EP) . |
| 0 749 029 A1 | 6/1996 | (EP) . |
| 59-14056 | 8/1985 | (JP) . |
| 60-217803 | 10/1987 | (JP) . |

(List continued on next page.)

OTHER PUBLICATIONS

M. Ohta et al.; "Develoment of Super–TFT–LCDs with In–Plane Switching Display Mode" Asia Display (1995), pp. 707–710.

R. Keifer et al.; "In–Plane Switching of Nematic Liquid Crystals" Japan Display (1992), pp. 547–550.

M. Oh–e, et al., "Principles and Characteristics of Electro–Optical Behaviour With In–Plane Switching Mode," Asia Display '95, pp. 577–580.

S. Matsumoto, et al., "LP–A: Display Characteristics of In–Plane–Switching (IPS) LCDs and a Wide–Viewing–Angle 14.5–in. IPS TFT–LCD," Euro Display '96, pp. 445–448.

(List continued on next page.)

*Primary Examiner*—William L. Sikes
*Assistant Examiner*—Tarifur R. Chowdhury
(74) *Attorney, Agent, or Firm*—Finnegan, Henderson, Farabow, Garrett, & Dunner, L.L.P.

(57) ABSTRACT

An in-plane switching mode liquid crystal display device (LCD) is disclosed in which a first portion of one pixel region has alignment direction clockwise inclined relative to the extension direction of the data electrode, and a second portion of the pixel region has alignment direction counterclockwise inclined relative to the extension direction of the data electrode. This in-plane switching mode LCD has an improved viewing angle characteristics.

15 Claims, 7 Drawing Sheets

U.S. PATENT DOCUMENTS

| | | | | |
|---|---|---|---|---|
| 5,464,669 | | 11/1995 | Kang et al. | 428/1 |
| 5,473,455 | * | 12/1995 | Koike et al. | 359/76 |
| 5,492,762 | | 2/1996 | Hirai et al. | 428/447 |
| 5,504,604 | * | 4/1996 | Takatori et al. | 359/75 |
| 5,576,858 | | 11/1996 | Ukai et al. | 359/59 |
| 5,598,285 | * | 1/1997 | Kondo et al. | 349/39 |
| 5,600,464 | * | 2/1997 | Ohe et al. | 349/123 |
| 5,602,662 | | 2/1997 | Rosenblatt et al. | 349/130 |
| 5,608,556 | | 3/1997 | Koma | 349/143 |
| 5,686,019 | | 11/1997 | Nakamura | 252/299.01 |
| 5,717,474 | * | 2/1998 | Sarma | 349/85 |
| 5,737,051 | | 4/1998 | Kondo et al. | 349/141 |
| 5,742,369 | | 4/1998 | Mihara et al. | 349/123 |
| 5,745,207 | | 4/1998 | Asada et al. | 349/141 |
| 5,757,455 | | 5/1998 | Sugiyama et al. | 349/129 |
| 5,760,856 | * | 6/1998 | Yanagawa et al. | 349/42 |
| 5,760,857 | | 6/1998 | Yanagawa et al. | 349/43 |
| 5,781,261 | | 7/1998 | Ohta et al. | 349/111 |
| 5,786,876 | | 7/1998 | Ota et al. | 349/42 |
| 5,793,459 | * | 8/1998 | Toko | 349/128 |
| 5,801,802 | * | 9/1998 | Inoue et al. | 349/123 |
| 5,831,701 | | 11/1998 | Matsuyama et al. | 349/110 |
| 5,841,499 | | 11/1998 | Baur et al. | 349/141 |
| 5,852,485 | | 12/1998 | Shimada et al. | 349/141 |
| 5,859,682 | * | 1/1999 | Kim et al. | 349/124 |
| 5,864,376 | * | 1/1999 | Takatori | 349/129 |
| 5,886,762 | | 3/1999 | Lee et al. | 349/141 |
| 5,907,380 | * | 5/1999 | Lien | 349/141 |
| 5,910,271 | | 6/1999 | Ohe et al. | 252/299.01 |
| 5,914,762 | | 6/1999 | Lee et al. | 349/141 |
| 5,926,244 | * | 7/1999 | Takeda et al. | 349/139 |
| 5,946,060 | | 8/1999 | Nishiki et al. | 349/48 |
| 5,946,067 | | 8/1999 | Kim et al. | 349/141 |
| 5,956,111 | | 9/1999 | Ohta et al. | 349/141 |
| 5,959,708 | | 9/1999 | Lee et al. | 349/143 |
| 5,969,782 | | 10/1999 | Lee et al. | 349/141 |
| 5,977,562 | | 11/1999 | Hirakata et al. | 257/72 |
| 5,995,186 | | 11/1999 | Hiroshi | 349/141 |
| 6,005,650 | * | 12/1999 | Kim et al. | 349/130 |
| 6,040,887 | | 3/2000 | Matsuyama et al. | 349/141 |

FOREIGN PATENT DOCUMENTS

| | | |
|---|---|---|
| 04067127 | 3/1992 | (JP) |
| 06273803 | 9/1994 | (JP) |
| 07036058 | 2/1995 | (JP) |
| 7-36058 | 2/1995 | (JP) |
| 07134301 | 5/1995 | (JP) |
| 07225388 | 8/1995 | (JP) |
| 7-225388 | 8/1995 | (JP) |
| 08062586 | 3/1996 | (JP) |
| 09005763 | 1/1997 | (JP) |
| 09005764 | 1/1997 | (JP) |
| 09005793 | 1/1997 | (JP) |
| 09033946 | 2/1997 | (JP) |
| 09043589 | 2/1997 | (JP) |
| 09043590 | 2/1997 | (JP) |
| 09101538 | 4/1997 | (JP) |
| 09105908 | 4/1997 | (JP) |
| 09105918 | 4/1997 | (JP) |
| 97-22458 | 5/1997 | (JP) |
| 96-32049 | 9/1997 | (JP) |
| 09258269 | 10/1997 | (JP) |
| 09269507 | 10/1997 | (JP) |
| 09325346 | 12/1997 | (JP) |
| 10-040330 | 8/1998 | (JP) |
| 10-083765 | 12/1998 | (JP) |
| 97-22458 | 5/1997 | (KR) |
| 98-83765 | 12/1998 | (KR) |
| 97/10530 | 3/1997 | (WO) |

OTHER PUBLICATIONS

H. Wakemoto, et al., "38.1: An Advanced In–Plane–Switching Mode TFT–LCD,"SID 97 Digest, pp. 929–932.

S.H. Lee, "High–Transmittance, Wide–Viewing–Angle Nematic Liquid Crystal Display Controlled by Fringe–Field Switching," Asia Display '98, pp. 371–374.

M. Ohta, et al., "S30–2 Development of Super–TFT–LCDs with In–Plane Switching Display Mode," Asia Display '95, pp. 707–710.

* cited by examiner

IN-PLANE SWITCHING MODE LIQUID CRYSTAL DISPLAY DEVICE HAVING OPPOSITE ALIGNMENT DIRECTIONS FOR TWO ADJACENT DOMAINS

BACKGROUND OF THE INVENTION

A. Field of the Invention

The present invention relates to a liquid crystal display device, and more particularly to an in-plane switching ("IPS") mode liquid crystal display device.

B. Description of the Related Art

Recently, the thin film transistor liquid crystal display devices (TFT LCDs) have been used as display devices in such applications as portable televisions and notebook computers, but these TFT LCDs have small viewing angles.

In order to solve this problem, twisted nematic LCDs having, for example, optical compensation films and multi-domains, have been introduced. In these LCDs, however, the color of the image is largely shifted as the viewing angle direction increases.

For a wide viewing angle, the IPS mode LCD is disclosed, for example, in JAPAN DISPLAY 92 page 547, Japanese Patent Unexamined Publication No. 7-36058, Japanese Patent Unexamined Publication No. 7-225388, and ASIA DISPLAY 95 page 707.

Figure 1:
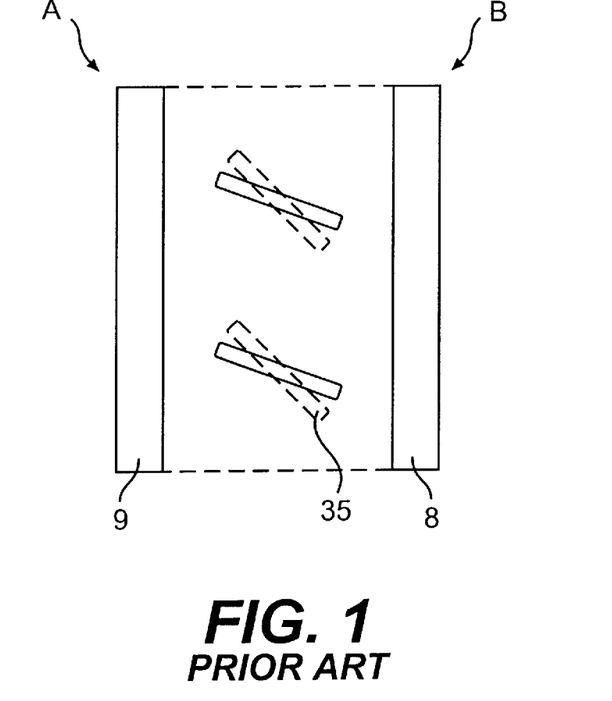
FIG. 1 is a view showing the operation of liquid crystal molecules in the conventional IPS mode LCD.
Figure 2:
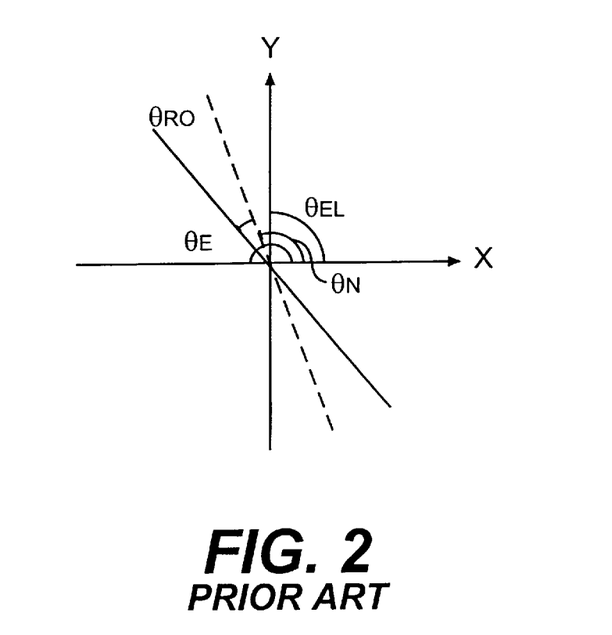
FIG. 2 is a view showing the long axis of the LC molecules shown in FIG. 1.

FIG. 1 is a view showing the operation of liquid crystal (LC) molecules of the conventional IPS mode LCD. FIG. 2 is a view showing the long axis of the LC molecules shown in FIG. 1. As shown in the figures, a data electrode 8 and a common electrode 9 are aligned in Y axis direction at an angle $\theta_{EL}=90°$ relative to the X axis direction which is the extension direction of a gate bus line (not shown). $\theta_E=180°$ indicates an angle between the direction of electric field and X axis direction. $\theta_R$ indicates an angle between the alignment direction and the X axis direction, and angle $\theta_R$ is determined by a rubbing process in the range of 90° to 180°. $\theta_{rot}$ indicates a rotated angle of liquid crystal molecules 35 by the electric field applied between the two electrodes.

When a voltage is not applied, liquid crystal molecules 35 denoted by dotted line are aligned according to the alignment direction at angle $\theta_R$. When the voltage is applied, liquid crystal molecules 35 rotate counterclockwise by angle $\theta_{rot}$. In the figures, liquid crystal molecules 35 are denoted by solid line after the voltage is applied, and a positive type liquid crystal is used in which electric permittivity of liquid crystal molecules in the long axis direction is larger than in the short axis direction. On the other hand, when negative type liquid crystal is used, the liquid crystal molecules are aligned perpendicular to the electric field direction.

Figure 3A:
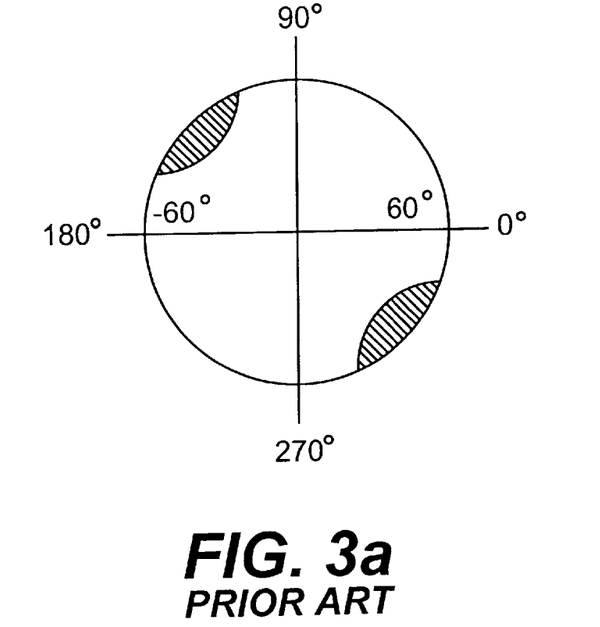
FIGS. 3a and 3b are views showing a contrast ratio and a color shift of the conventional IPS mode LCD respectively.
Figure 3B:
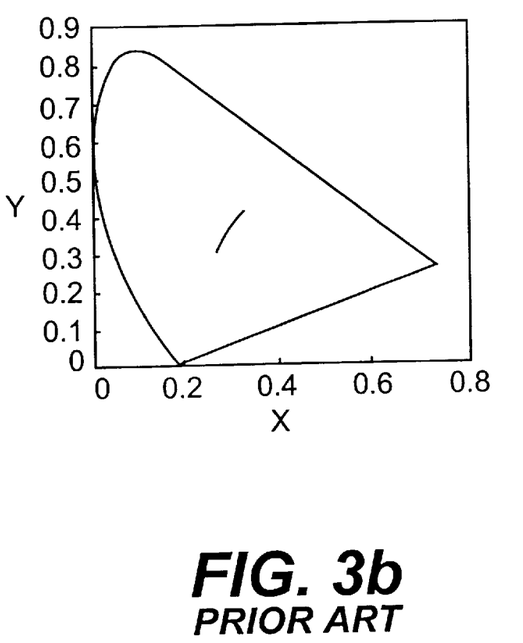

However, in the conventional IPS mode LCD, grey level inversion is caused by birefringence of the liquid crystal molecules as shown in FIG. 3a. Further, as shown in FIG. 3b, a white color is shifted to blue and yellow colors respectively in A and B viewing directions shown in FIG. 1.

SUMMARY OF THE INVENTION

An object of the present invention is to prevent a color shift in an in-plane switching mode liquid crystal display device.

Another object of the present invention is to prevent a grey level inversion in an in-plane switching mode liquid crystal display device.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the in-plane switching mode liquid crystal display of the present invention comprises: a first substrate having a plurality of pixels, data and common electrodes over the first substrate and substantially parallel with a reference direction, a first alignment layer over the data and common electrodes, wherein at least one of the plurality of pixels has a plurality of domains, and at least two adjacent domains of the plurality of domains have alignment directions opposite one another with respect to the reference direction.

In another aspect the in-plane switching mode liquid crystal display of the present invention comprises: a substrate having a plurality of pixels, data and common electrodes over the substrate and substantially parallel with a reference direction, an alignment layer over the data and common electrodes and having first and second domains adjacent one another, each of the first and second domains having at least one of the plurality of pixels and an alignment direction opposite that of the other domain with respect to the reference direction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

In the figures.

DETAILED DESCRIPTION

Reference will now be made in detail to the embodiments of the present invention, examples of which are illustrated in the accompanying drawings. Wherever possible, the same reference numbers will be used throughout the drawings to refer to the same or like parts.

Figure 4A:
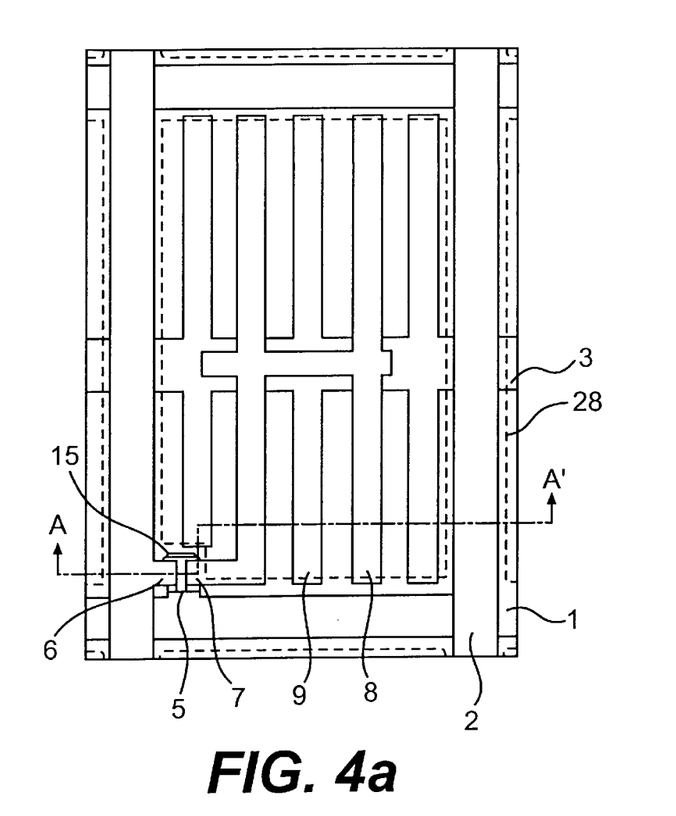
FIGS. 4a and 4b are plan and sectional views showing an IPS mode LCD according to the present invention.
Figure 4B:
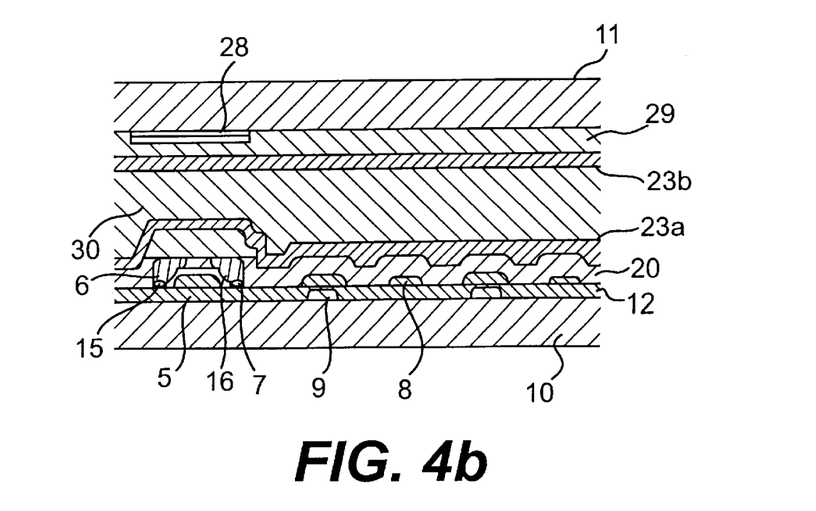

FIGS. 4a and 4b are plane and sectional views showing one pixel region of the IPS LCD implemented according to the present invention, where FIG. 4b is a sectional view taken along line A–A' of FIG. 4a. As shown in these figures, a gate bus line 1 and a data bus line 2 are aligned to cross each other on a first substrate 10, defining a pixel region. Although only one pixel region is shown in the figures, a liquid crystal display device generally has a plurality of pixel regions.

At the cross of gate and data bus lines 1 and 2, a thin film transistor (TFT) is formed, which comprises a gate electrode 5, a gate insulating layer 12, a semiconductor layer 15, an n+ semiconductor layer 16, a source electrode 6 and a drain electrode 7.

In the pixel region, a data electrode 8 and a common electrode 9 are formed parallel to each other. Gate and common electrodes 5 and 9 are connected electrically to gate and common bus lines 1 and 3 respectively, and source and drain electrodes 6 and 7 are connected electrically to data bus line 2 and data electrode 8 respectively.

Gate and common electrodes 5 and 9 are formed by etching a metal layer deposited by sputtering a metal such as Al, Mo, Ta or Al alloy. Gate insulating layer 12 is formed by depositing silicon oxide or silicon nitride on the surface of first substrate 10 which includes gate electrode 5, common electrode 9, and gate bus line 1. Semiconductor layer 15 is formed by etching an amorphous silicon layer deposited on gate insulating layer 12. n+ semiconductor layer 16 is formed by depositing an n+ amorphous silicon layer or doping an n+ ion into predetermined regions of the semiconductor layer 15. A passivation layer 20 is formed thereon by depositing silicon oxide or silicon nitride. Data bus line 2, data electrode 8, source electrode 6, and drain electrode 7 are formed thereon by depositing and etching a metal such as Cr.

On passivation layer 20, a first alignment layer 23a is formed by coating polyimide, polyamide or photo alignment materials. The polyimide or polyamide alignment layer is rubbed to impart an alignment direction. On the other hand, the photo-alignment layer such as polyvinylcinnamate or polysiloxane based materials may also be used and be exposed to an ultraviolet light to impart an alignment direction.

On a second substrate 11, a black matrix 28 is formed to prevent a leakage of light through the regions of the TFT and gate, data and common bus lines 1, 2 and 3. Black matrix 28 is formed by depositing and patterning a Cr layer, a CrOx layer, or a black resin layer. A color filter layer 29 is formed thereon, which has one of R, G and B color filter elements (not shown) in each of the pixel regions. A second alignment layer 23b is formed thereon by coating polyimide or polyamide, or photo-alignment materials such as polyvinylcinnamate or polysiloxane based materials.

A liquid crystal layer 30 is formed by injecting liquid crystal between the two substrates.

Figure 5:
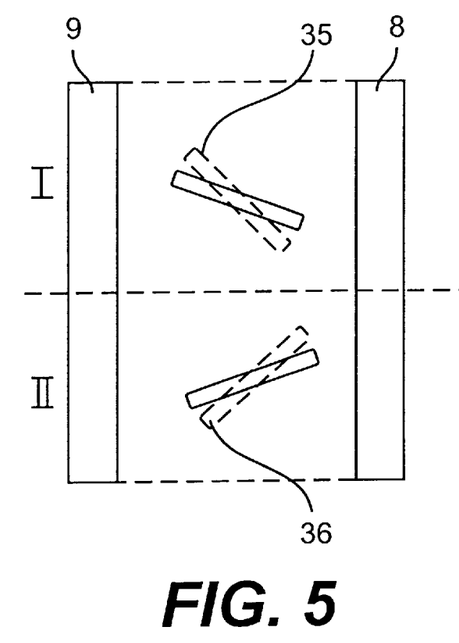
FIG. 5 is a view showing the operation of liquid crystal molecules in a first embodiment of the present invention.
Figure 6:
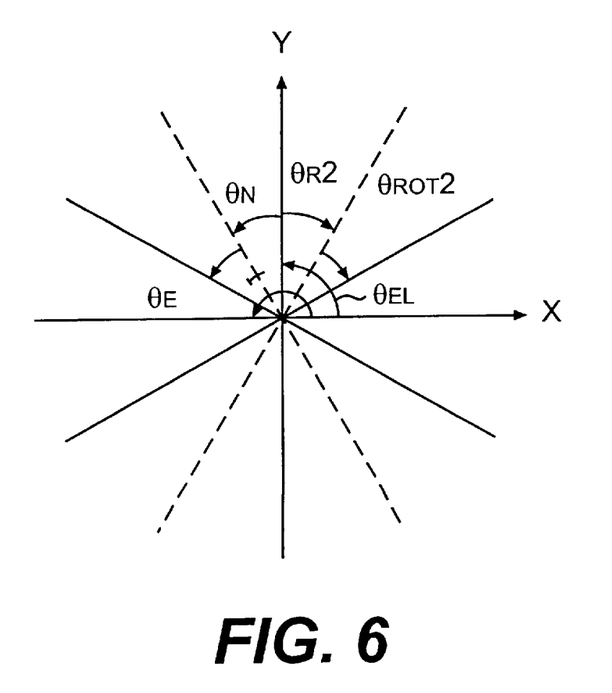
FIG. 6 is a view showing a long axis of the LC molecules shown in FIG. 5.

FIG. 5 is a view showing the operation of liquid crystal (LC) molecules in a first embodiment of the present invention. FIG. 6 is a view showing the long axis of the LC molecules shown in FIG. 5. Although not illustrated in FIGS. 4a and 4b, this embodiment is characterized in that one pixel region is divided into a first domain I and a second domain II which are arranged parallel to the extension direction of the two electrodes. In FIG. 5, only a pair of electrodes 8 and 9 is illustrated for convenience of explanation.

As shown in FIGS. 5 and 6, data electrode 8 and common electrode 9 are aligned in Y axis direction at an angle $\theta_{EL}=90°$ relative to the X axis direction that is the extension direction of gate bus line 1 shown in FIG. 4a. $\theta_E=180°$ indicates an angle between the electric field and X axis directions. $\theta_{R1}$ and $\theta_{R2}$ indicate angles of inclination between the Y axis direction and the first and second alignment directions respectively. $\theta_{rot1}$ and $\theta_{rot2}$ indicate the rotated angles of LC molecules 35 and 36 in the first and second domains respectively. In this embodiment, it is preferable that the LC molecules 35 and 36 in the two domains are aligned symmetrically relative to the extension directions of electrodes 8 and 9.

When a voltage is not applied to the device, LC molecules 35 and 36 are aligned according to the alignment directions of the first and second domains. A positive type liquid crystal is used in this embodiment, and therefore the two alignment directions are determined in the ranges of 0° to 45°. On the other hand, when a negative type liquid crystal is used, the two alignment directions are determined in the ranges of 45° to 90°. In order to obtain an untwisted mode LCD, alignment directions of the second alignment layer are determined to be the same as alignment directions of the first alignment layer. On the other hand, the alignment directions of the second alignment layer are determined to be perpendicular to the alignment directions of the first alignment layer to obtain a twisted mode LCD.

When a voltage is applied to the device, liquid crystal molecules 35 and 36 in the first and second domains are rotated in opposite directions to each other by angles $\theta_{rot1}$ and $\theta_{rot2}$ respectively, being symmetrical relative to the extension direction of data and common electrode 8 and 9.

In this embodiment according to the present invention, the grey level inversion and the color shift can be prevented by the rotation of liquid crystal molecules in opposite directions, improving the viewing angle characteristics.

Figure 7A:
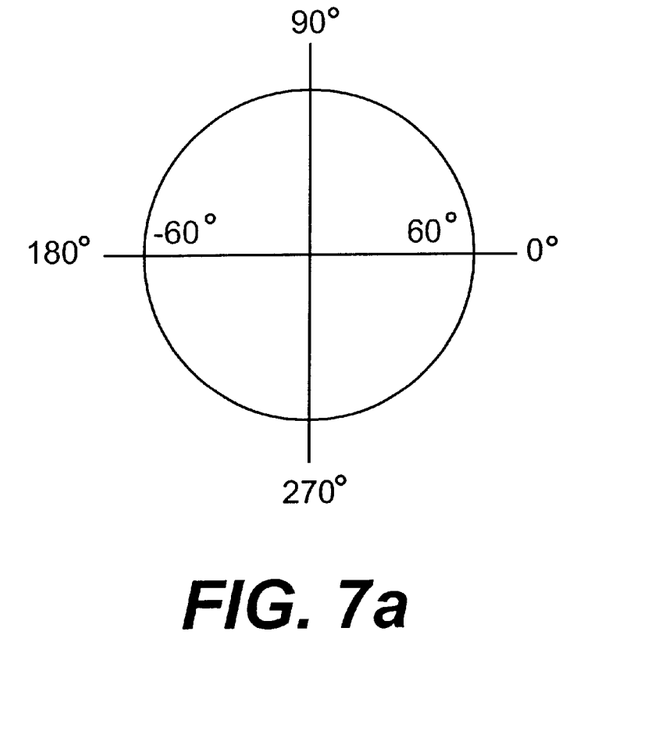
FIGS. 7a and 7b are views showing a viewing angle characteristic and a color shift of the present invention respectively.
Figure 7B:
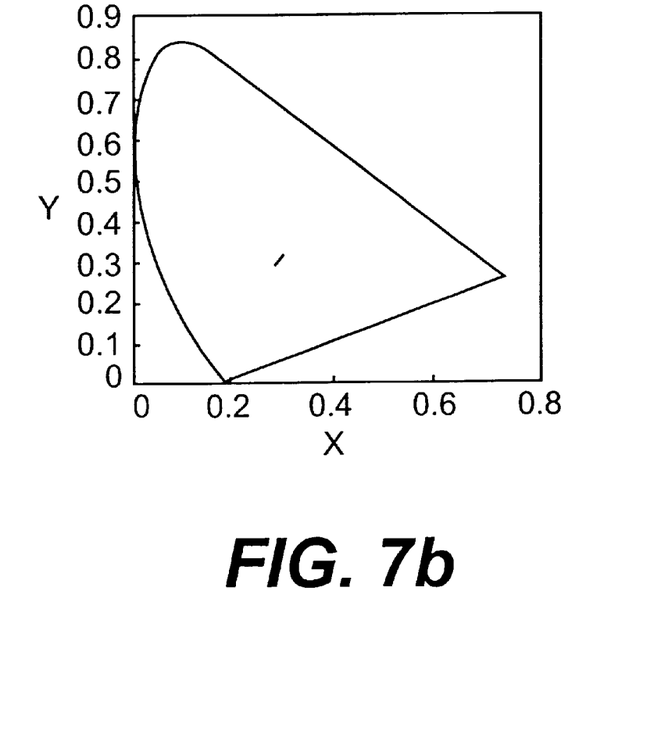

FIGS. 3a and 3b are views showing the contrast ratio and the color shift of the conventional IPS mode LCD respectively, where grey level inversion regions are denoted by the shaded areas. FIG. 7a and FIG. 7b are views showing the contrast ratio and the color shift in the present invention respectively. As shown in FIG. 3a, the conventional IPS mode LCD has grey level inversion regions at polar viewing angle 60° and at azimuthal viewing angles between 90° and 180° and between 270° and 0°, while there is no grey level inversion in the LCD implemented according to the present invention at polar viewing angle 60° as shown in FIG. 7a.

As shown in FIG. 3b, the conventional IPS mode LCD has a wide white color shift, while the present invention has a narrow white color shift as shown in FIG. 7b.

Figure 8:
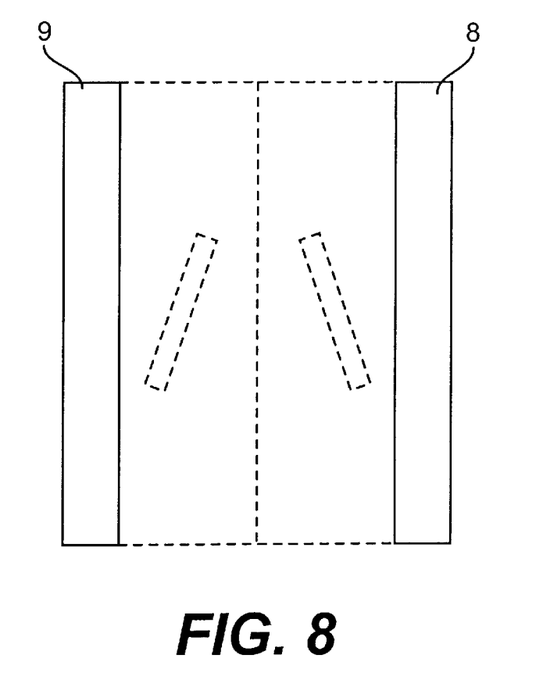
FIG. 8 is a view showing a second embodiment of the present invention.

FIG. 8 is a view showing a second embodiment, wherein one pixel region is divided into two domains which are arranged perpendicular to the extension direction of electrodes 8 and 9.

Figure 9:
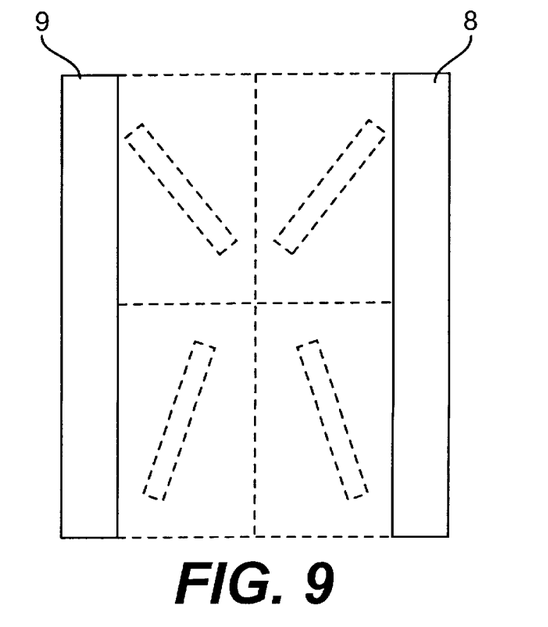
FIG. 9 is a view showing a third embodiment of the present invention.

FIG. 9 is a view showing a third embodiment, wherein one pixel region is divided into four domains. Alignment directions in the two upper domains are inclined in opposite directions to each other relative to the extension directions of data and common electrodes 8 and 9. Alignment directions in the two lower domains are also inclined in opposite directions to each other relative to the extension directions. In this embodiment, alignment directions in two left domains and in two right domains are inclined in opposite directions to each other, compensating for grey level inversions and color shifts of each other.

In the embodiments according to the present invention, one pixel region is divided into a plurality of domains.

Generally, it is preferable that half of the plural domains have alignment directions clockwise inclined relative to the extension directions of the data and common electrodes, and the other half of the plural domains have alignment directions counterclockwise inclined relative to the extension directions of the data and common electrodes, so that the alignment directions of the half of the plural domains are symmetrical to those of the other half of the plural domains relative to the extension directions of the data and common electrodes.

Figure 10:
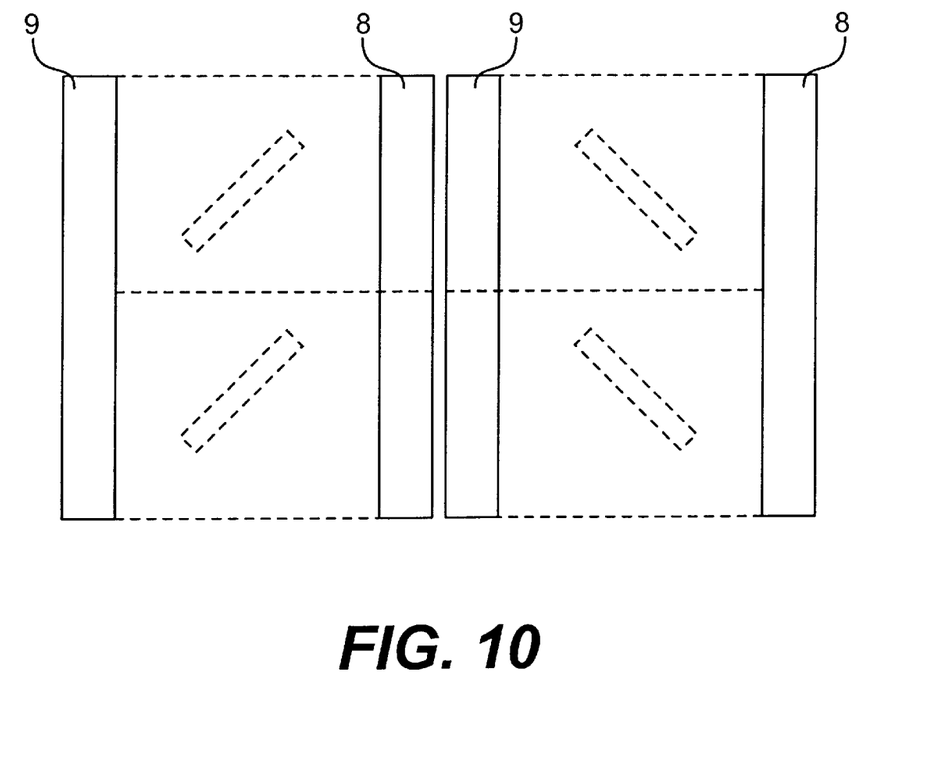
FIG. 10 is a view showing a fourth embodiment of the present invention.

FIG. 10 is a view showing a fourth embodiment, wherein the alignment directions in adjacent two pixel regions are inclined in symmetrically opposing directions to each other relative to the extension directions of two electrodes 8 and 9. Further, the present invention can provide an IPS mode LCD in which adjacent plural pixel regions of more than two, for example four adjacent pixel regions, are aligned symmetrically relative to the extension directions of data and common electrodes 8 and 9, so that they are rotated in opposite directions to each other. In this case, it is preferable that half of the plural pixel regions have alignment directions inclined clockwise relative to the data and common electrodes, and the other half of the plural pixel regions have alignment directions inclined counterclockwise relative to the data and common electrodes.

In the IPS mode LCD according to the present invention, because each LC molecules in plural domains or in adjacent plural pixel regions are symmetrically rotated in opposite directions so as to compensate for the angular dependence of each other, grey level inversion and color shift are eliminated to improve the viewing angle characteristics.

It will be apparent to those skilled in the art that various modifications and variations can be made in the in-plane liquid crystal display device of the present invention and in construction of this device without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. An in-plane switching mode liquid crystal display device, comprising:
   a first substrate having a plurality of pixel region;
   data and common electrodes over the first substrate and substantially parallel with a reference direction; and
   a first alignment layer over the data and common electrodes, wherein at least one of said plurality of pixel region has a plurality of domains, and at least two adjacent domains of said plurality of domains have alignment directions opposite one another with respect to said reference direction.

2. The device according to claim 1, further comprising:
   a second substrate facing the first substrate; and
   a second alignment layer over the second substrate.

3. The device according to claim 2, wherein said second alignment layer has an alignment direction parallel with an alignment direction of said first alignment layer.

4. The device according to claim 2, wherein said second alignment layer has an alignment direction perpendicular to an alignment direction of said first alignment layer.

5. The device according to claim 2, wherein said second alignment layer includes a material selected from the group consisting of polyimide, polyamide, polyvinylcinnamate and polysiloxane based materials.

6. The device according to claim 1, wherein said first alignment layer includes a material selected from the group consisting of polyimide, polyamide, polyvinylcinnamate and polysiloxane based materials.

7. The device according to claim 1, wherein said reference direction includes a longitudinal direction of one of said data and common electrodes.

8. An in-plane switching mode liquid crystal display device, comprising:
   a first substrate having a plurality of pixel regions;
   data and common electrodes over the first substrate and substantially parallel with a reference direction; and
   an alignment layer over the data and common electrodes and having first and second domains adjacent to one another, each of said first and second domains having at least one of said plurality of pixel regions, and each of said first and second regions adjacent to one another having an alignment direction opposite that of the other domain with respect to said reference direction.

9. The device according to claim 8, wherein said first and second domains have an equal number of pixel region.

10. The device according to claim 8, wherein the alignment directions of said first and second domains are symmetrical to one another with respect to said reference direction.

11. The device according to claim 8, wherein said first and second domains each have one pixel region.

12. The device according to claim 8, wherein the first and second domains each have two pixel region.

13. The device according to claim 8, wherein said reference direction includes a longitudinal direction of one of said data and common electrodes.

14. An in-plane switching mode liquid crystal display device comprising:
   a substrate;
   data and common electrodes over the substrate and substantially parallel with a reference direction; and
   at least one alignment layer over the data and common electrodes, wherein a surface of said alignment layer has first and second domains adjacent one another, and said first and second domains have alignment directions opposite one another with respect to said reference direction.

15. The device according to claim 14, wherein said reference direction includes a longitudinal direction of one of said data and common electrodes.

* * * * *

UNITED STATES PATENT AND TRADEMARK OFFICE
CERTIFICATE OF CORRECTION

PATENT NO. : 6,184,961 B1  Page 1 of 1
DATED : February 6, 2001
INVENTOR(S) : Yong Sung Ham It is certified that error appears in the above-identified patent and that said Letters Patent is hereby corrected as shown below:

<u>Column 5,</u>
Line 47, "region" should read -- regions --.
Line 52, "region" should read -- regions --.

<u>Column 6,</u>
Line 31, "region" should read -- regions --.
Line 39, "region" should read -- regions --.

Signed and Sealed this

Twenty-first Day of January, 2003

JAMES E. ROGAN
*Director of the United States Patent and Trademark Office*